Patented Dec. 1, 1936

2,062,911

UNITED STATES PATENT OFFICE 2,062,911

INSECTICIDAL COMPOSITIONS AND PROCESSES USING THE SAME

Morris S. Kharasch, Chicago, Ill., assignor to E. I. du Pont de Nemours & Company, Wilmington, Del., a corporation of Delaware No Drawing. Application February 26, 1936, Serial No. 65,787

6 Claims. (Cl. 167—14)

This invention relates to the protection of plants by applying thereto a stomach poison, and is particularly directed to processes and to insecticidal compositions which employ a salt of Reinecke's acid.

Numerous insecticidal compositions are at present being employed to destroy leaf eating insects. These include compounds of lead, arsenic, fluorine, and the like which are more or less dangerous to handle, and which have a cumulative poisoning effect on humans.

I have found that the salts of Reinecke's acid are highly effective stomach poisons for leaf eating insects. These materials may advantageously be employed for the protection of the foliage of plants, and while exceedingly effective for the poisoning of insects, these compounds are relatively non-toxic to humans and do not have a cumulative poisoning effect.

Reinecke's acid, tetrathiocyanatodiamminochromium, has the following formula:

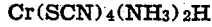

$$Cr(SCN)_4(NH_3)_2H$$

The insecticidal compositions of this invention contain as an active ingredient a salt of Reinecke's acid. I may, for instance, use such a salt as ammonium tetrathiocyanatodiamminochromium, which has the formula:

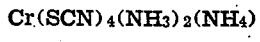

$$Cr(SCN)_4(NH_3)_2(NH_4)$$

As further examples of suitable salts, I may mention the alkali metal salts, such as sodium or potassium tetrathiocyanatodiamminochromium, and the salts of Reinecke's acid with ammonium derivatives, such as trimethyl phenyl ammonium, piperidine, guanidine, methylamine, toluidine, and the like.

While the heavy metal salts of Reinecke's acid are more dangerous to handle and have a cumulative poisoning effect, it is within the scope of this invention to employ copper, mercury, alkylated mercury, such as ethyl mercury, and the like salts of Reinecke's acid.

The following examples are given more completely to explain the practice of my invention.

Example I

One part of piperidinium tetrathiocyanatodiamminochromium suspended in two hundred and fifty parts of water was used to spray potato plants infested with the Colorado potato beetle. More than ninety five per cent of the beetles were killed and nearly all feeding was prevented.

Example II

A solution prepared as in Example I, when sprayed on apples, reduced infection by codling moth approximately ninety per cent as compared with untreated fruit.

Example III

One part of piperidinium tetrathiocyanatodiamminochromium was diluted with twenty parts of talc and used to dust potato plants infested with the Colorado potato beetle. By this treatment, one hundred per cent of the beetles were killed, and nearly all feeding was prevented.

Example IV

One part of guanidine tetrathiocyanatodiamminochromium was suspended in two hundred fifty parts of water and used to spray apples. More than eighty per cent of infection by codling moth was prevented.

Example V

One part of guanidine tetrathiocyanatodiamminochromium was diluted with twenty parts of talc and used to dust bean plants infested with the Mexican bean beetle. Following this procedure, one hundred per cent of the bean beetles were killed.

While I have shown a number of specific compounds and procedures above, it will be understood that I do not intend to be limited thereto. Any salt of Reinecke's acid may advantageously be employed, and the insecticidal compositions of this invention may be applied in conjunction with other insecticidal ingredients, spreading agents, diluents, and the like in accordance with customary practice.

I claim:

1. In a process for the protection of plants against leaf-eating insects, the step comprising applying thereto an insecticidal composition comprising a salt of Reinecke's acid.

2. In a process for the protection of plants against leaf-eating insects, the step comprising applying thereto an insecticidal composition comprising piperidinium tetrathiocyanatodiamminochromium.

3. In a process for the protection of plants against leaf-eating insects, the step comprising applying thereto an insecticidal composition comprising guanidine tetrathiocyanatodiamminochromium.

4. An insecticidal composition containing as an active ingredient a salt of Reinecke's acid.

5. An insecticidal composition containing as an active ingredient piperidinium tetrathiocyanatodiamminochromium.

6. An insecticidal composition containing as an active ingredient guanidine tetrathiocyanatodiamminochromium.

MORRIS S. KHARASCH.